(No Model.)   3 Sheets—Sheet 1.

W. STANLEY, Jr.
ELECTRIC GENERATOR.

No. 349,615.   Patented Sept. 21, 1886.

Witnesses
Geo. W. Breck
Carrie E. Ashley

Inventor
William Stanley Jr.,
By his Attorneys
Pope & Edgecomb (No Model.) W. STANLEY, Jr. 3 Sheets—Sheet 3.
ELECTRIC GENERATOR.

No. 349,615. Patented Sept. 21, 1886.

Witnesses
Geo. W. Breck.
Carrie E. Ashley

Inventor
William Stanley Jr.,
By his Attorneys
Pope & Edgcomb

United States Patent Office.

WILLIAM STANLEY, JR., OF GREAT BARRINGTON, MASSACHUSETTS, ASSIGNOR TO GEORGE WESTINGHOUSE, JR., OF PITTSBURG, PA.

ELECTRIC GENERATOR.

SPECIFICATION forming part of Letters Patent No. 349,615, dated September 21, 1886.

Application filed February 10, 1886. Serial No. 191,404. (No model.)

*To all whom it may concern:*

Be it known that I, WILLIAM STANLEY, Jr., a citizen of the United States, residing in Great Barrington, in the county of Berkshire and State of Massachusetts, have invented certain new and useful Improvements in Electric Generators, of which the following is a specification.

The invention relates to the class of apparatus employed for producing alternating electric currents.

The object of the invention is to provide a simple form of machine for producing alternating electric currents, which shall have but few parts, and those so related as to be easily put together in constructing the machine.

The invention consists in forming the machine in substantially the following manner: A cylindrical casting is made having inwardly-projecting arms. These arms constitute cores, and coils of insulated wire, which are formed into suitable bobbins, are slipped over them. To retain the bobbins in position bands or rings of non-magnetic material are pinned to the ends of the cores after the coils have been placed upon them. The armature core consists of a series of flat plates of soft iron, which are bound together, but are preferably magnetically separated from each other. These plates are formed with projecting lugs, around which the wire of the armature is wound. The wire is preferably applied by being laid in the spaces between the projections and across the side faces of the armature at the ends of the projections. The wire may be wound continuously about the periphery of the armature in the spaces between the lugs in a zigzag direction, or it may be wound several times about one lug, forming a complete bobbin, and then led to the next projection and wound about it. The collector-brushes are applied to two cylindrical contact-surfaces carried upon the armature-shaft and insulated from each other. The collectors are supported from the frame of the instrument, and are pressed toward their respective contact-surfaces by suitable springs.

Figure 1:
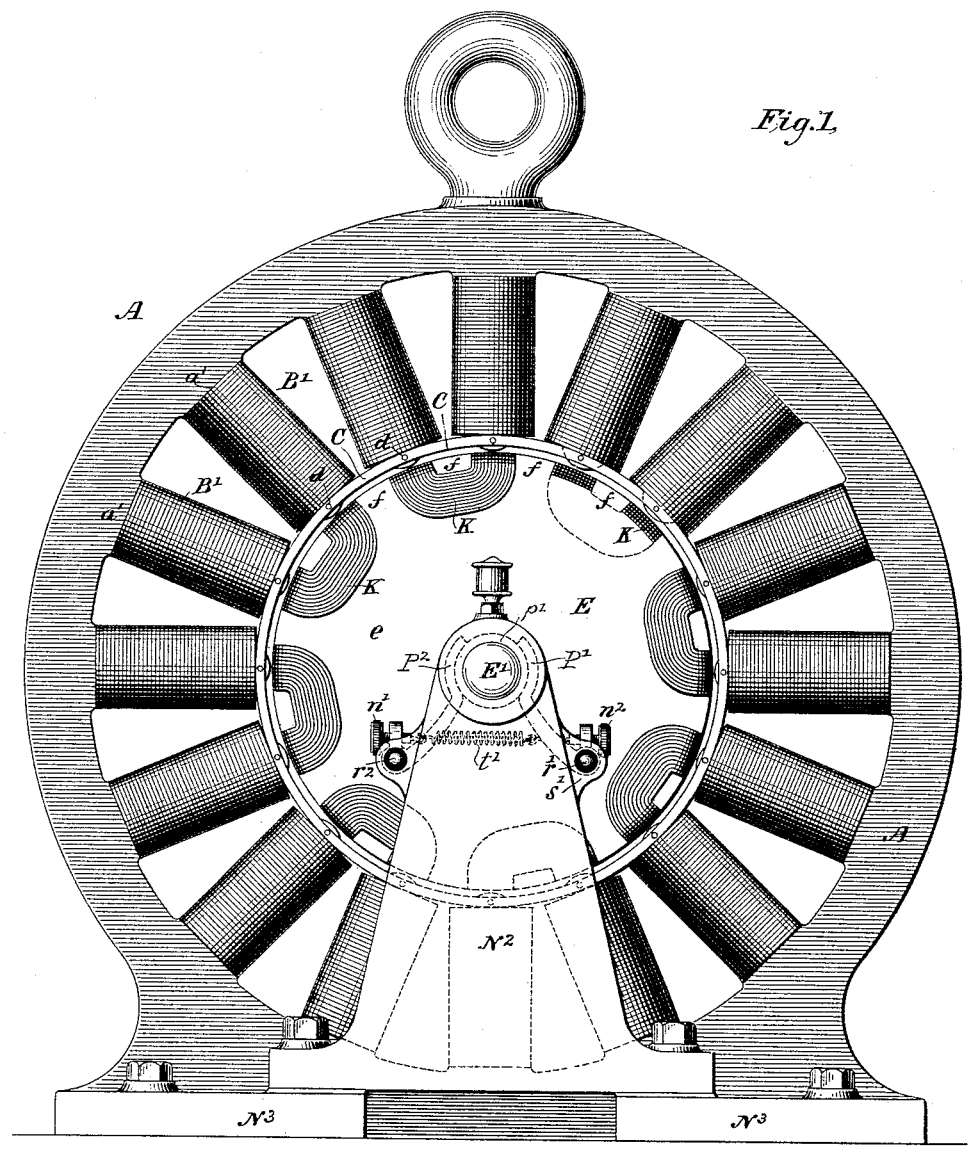
Figure 2:
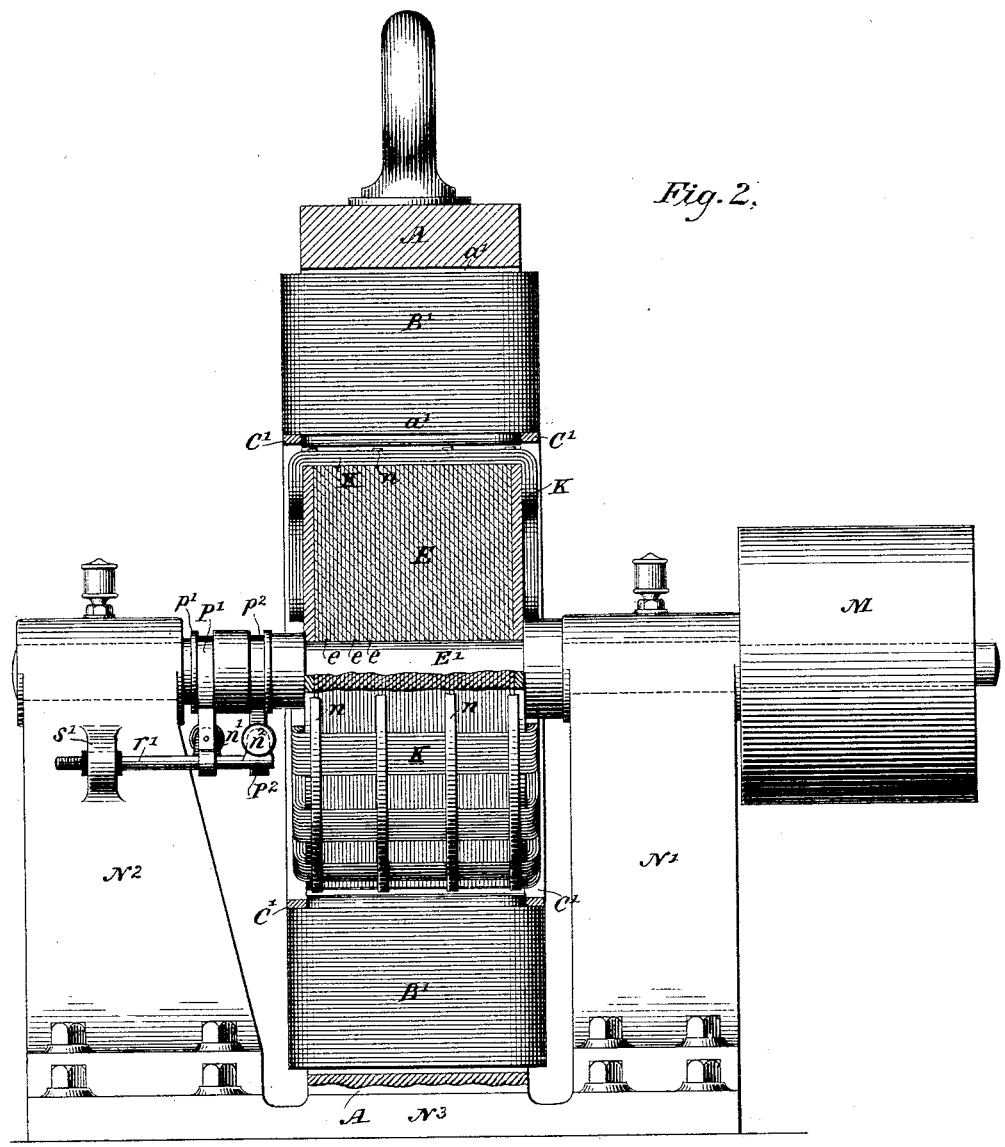
Figure 3:
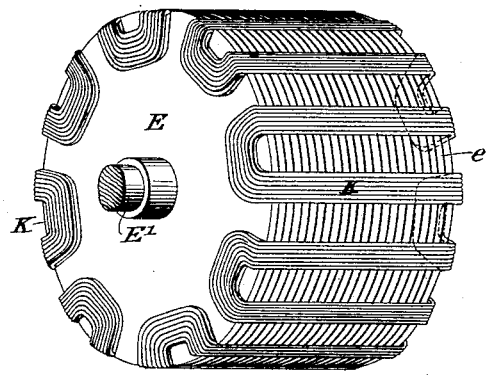

In the accompanying drawings, Figure 1 is an end elevation of a machine embodying the improvements; and Fig. 2 is a front view of the same, partly in section. Fig. 3 illustrates a modified form of armature.

Referring to the drawings, A represents a cylindrical casting having inwardly-projecting arms or cores $a'$ $a'$. Upon these cores there are slipped spools or bobbins of insulated wire, B' B', &c. Two bands, C' and C², of brass or other non-magnetic material of such size as to fit within the circle formed by the inner ends of the bobbins of wire are pinned to the respective cores, as shown at $d'$ $d'$. These serve to hold the coils in position. Preferably one of these bands is applied at each side of the cores. The projecting ends of the field-magnet cores $a'$ $a'$ are preferably cut away upon their opposite faces or formed in parabolic curves, so that as the armature projections approach and recede there will be a steady increase of magnetic effect up to a certain point, and then a constant decrease, and thus there will be fluctuation in the current generated.

The armature E consists of a series of plates, $e$ $e$, &c., which are preferably magnetically separated from each other by sheets of vulcanized fiber, paper, or other suitable material, and bound together in any suitable manner. The armature is carried upon a shaft, E'. The plates $e$ $e$ are constructed with a series of radial projections, $f$, and when bound together these projections lie side by side, and these projections together constitute the armature projections, about which coils K, of insulated wire, are wound. The number of these projections may with advantage be the same as the number of cores $a'$ $a'$. The coils K are formed by passing the wire across the face of the armature parallel with its axis, then downward upon one side in a radial direction, then in a direction at right angles to the axis, then radially from the axis and again across the face of the armature to the other side. The wires so wound are preferably bound in position by means of suitable bands or rings, $n$ $n$, of non-magnetic material, or by wire wound circumferentially upon the face of the armature.

The armature is carried upon the shaft E', which is provided with a driving-wheel, M, and has its bearings in two supports, N' and N². These are preferably secured to the base-plate N³ by suitable bolts in any convenient manner.

One end of the series armature-coils is connected with a collector-plate, $p'$, and the other end with a similar plate, $p^2$. The currents are collected from these plates, respectively, by brushes P' and P². The former of these is carried upon an insulated rod or arm, $r'$, which is supported in a lug, $s'$, upon the upright N². A spring, $t'$, leads from the rod $r'$ to an adjusting-screw, $n'$, carried upon the rod $r^2$, and a similar spring, $t^2$, is attached at one end to the arm $r^2$, and at the other end to an adjusting-screw, $n^2$, upon a rod, $r'$. By means of these the pressure of the collector-brushes against the collector-plates may be modified. The brushes are movable toward and from the plates by being loosely supported upon their respective supporting-rods; or they may be rigidly attached to the rods and the latter loosely mounted in their respective lugs.

In Fig. 3 a modification in the method of applying the wire to the armature is illustrated. This consists in applying it in a serpentine direction, instead of winding each bobbin continuously.

I claim as my invention—

1. An alternate-current electric machine consisting of a cylindrical frame having inwardly-projecting arms or cores, bobbins of wire surrounding the respective cores, an armature within the circle of said cores, two collector-plates revolving with the armature with which the respective terminals of the armature-coils are connected, collector-brushes bearing against said plates, respectively, and yielding springs tending to draw said brushes toward each other and against the respective plates.

2. An armature-core for electrical generators, consisting of magnetically-separated laminæ of iron having radial lugs, in combination with bobbins of wire surrounding the lugs, the wire composing the bobbins being wound upon the periphery of the armature in a serpentine direction and laid along the ends of the armature-core at the opposite ends of the alternate lugs.

3. A field-magnet for electric generators, having a series of radial polar projections, the ends of which are formed in parabolic curves, in combination with an armature adapted to rotate within the field of said projections.

4. The combination, substantially as hereinbefore set forth, of the supporting-cylinder, the radial cores projecting inwardly therefrom, the bobbins of wire upon the cores, and the bands secured to the cores for holding the bobbins in position.

In testimony whereof I have hereunto subscribed my name this 28th day of January, A. D. 1886.

WILLIAM STANLEY, JR.

Witnesses:
DANL. W. EDGECOMB,
CHARLES A. TERRY.